United States Patent
Apland et al.

(10) Patent No.: US 8,899,038 B2
(45) Date of Patent: Dec. 2, 2014

(54) RELEASE ACTUATOR EMPLOYING COMPONENTS WITH DIFFERENT COEFFICIENTS OF THERMAL EXPANSION

(75) Inventors: Clint T. Apland, Elkridge, MD (US); David R. Weir, Hanover, PA (US); David F. Persons, Columbia, MD (US); Michael T. Marley, Elkridge, MD (US)

(73) Assignee: The Johns Hopkins University, Baltimore, MD (US)

( * ) Notice: Subject to any disclaimer, the term of this patent is extended or adjusted under 35 U.S.C. 154(b) by 169 days.

(21) Appl. No.: 13/587,150

(22) Filed: Aug. 16, 2012

(65) Prior Publication Data
US 2013/0055709 A1    Mar. 7, 2013

Related U.S. Application Data

(60) Provisional application No. 61/530,236, filed on Sep. 1, 2011.

(51) Int. Cl.
*F01B 29/10* (2006.01)
*F03G 7/06* (2006.01)

(52) U.S. Cl.
CPC ...................................... *F03G 7/06* (2013.01)
USPC .............. 60/528; 60/527; 60/516; 49/1; 49/2; 403/28; 403/30; 403/273

(58) Field of Classification Search
CPC .............................................. F16B 2001/0078
USPC ................ 403/28, 30, 273; 60/516, 527, 528; 49/1, 2; 411/32, 82.5
See application file for complete search history.

(56) References Cited

U.S. PATENT DOCUMENTS

| | | | |
|---|---|---|---|
| 4,330,369 A | 5/1982 | Anderson | |
| 4,621,026 A * | 11/1986 | Robinson | 428/422 |
| 5,287,613 A * | 2/1994 | Dahl | 29/447 |
| 5,937,708 A * | 8/1999 | Ito et al. | 464/179 |
| 6,002,551 A | 12/1999 | Goss et al. | |
| 6,339,868 B1 * | 1/2002 | Nagaya et al. | 29/447 |
| 6,595,528 B2 * | 7/2003 | Voss | 279/102 |
| 7,062,127 B2 | 6/2006 | Purchase et al. | |
| 7,255,538 B2 * | 8/2007 | Shi | 416/244 A |
| 7,264,305 B2 | 9/2007 | Kuriakose | |
| 7,539,364 B2 | 5/2009 | Cole et al. | |
| 7,845,575 B2 | 12/2010 | Franconi | |
| 2001/0041106 A1 * | 11/2001 | Nagaya et al. | 407/101 |
| 2010/0047540 A1 | 2/2010 | Asanuma et al. | |
| 2010/0219593 A1 * | 9/2010 | Puzio et al. | 279/30 |

(Continued)

*Primary Examiner* — Thomas Denion
*Assistant Examiner* — Xiaoting Hu
(74) *Attorney, Agent, or Firm* — Noah J. Hayward

(57) ABSTRACT

An actuator includes a capturing part, a retained part and a heating element which applies heat to the retained part or the capturing part responsive to selective application of power to the at least one heating element. The capturing part attaches to a first object and has a first coefficient of thermal expansion. The retained part attaches to a second object and has a second coefficient of thermal expansion. The retained part is insertable into the capturing part in a first state of the actuator. The retained part is held in contact with the capturing part via an interference fit to hold the first and second objects proximate to each other in a second state. The retained part is ejected from the capturing part in a third state. Applying heat via the heating element causes a transition between the second and the first or third states of the actuator.

16 Claims, 5 Drawing Sheets

(56) References Cited

U.S. PATENT DOCUMENTS

2010/0298743 A1* 11/2010 Nield et al. .................. 601/2
2011/0148551 A1   6/2011 Lagorsse et al.
2011/0299915 A1* 12/2011 Crane et al. ................ 403/28

* cited by examiner

RELEASE ACTUATOR EMPLOYING COMPONENTS WITH DIFFERENT COEFFICIENTS OF THERMAL EXPANSION

CROSS-REFERENCE TO RELATED APPLICATIONS

This application claims priority to and the benefit of prior-filed, U.S. Provisional Application No. 61/530,236, filed on Sep. 1, 2011, the entire contents of which are hereby incorporated herein by reference.

TECHNICAL FIELD

Example embodiments generally relate to releasable electro-mechanical actuators and, more particularly, relate to a release actuator employing components with different coefficients of thermal expansion.

BACKGROUND

Releasable actuators of many kinds have been used to selectively hold parts together. Such actuators may range from very simple to more complex designs and may have many different release mechanisms. Given the wide variance in design and materials that have been employed, it will be appreciated that there is a corresponding wide variance in the costs, reliability characteristics, and performance characteristics of such devices. However, for certain operating environments, reliability and performance cannot be sacrificed.

For example, submerged applications and/or flight applications (including space flight) may place actuators in critical situations where the cost of failure can be quite high, and the environment can also be quite inhospitable. Instrumentation, satellite payloads, and other equipment that may employ or be used in connection with such actuators may need to be reliably operable, but also operate without introducing significant shock. At the same time, simplicity of design and part economy may also be important. However, production of an actuator balancing all of the design factors mentioned above has been a significant challenge.

BRIEF SUMMARY OF SOME EXAMPLES

Accordingly, some example embodiments include a relatively simple and reliable actuator. Some example embodiments employ two parts that have different coefficients of thermal expansion (CTE). Accordingly, for example, the parts releasably fit together at a first temperature and then, subsequent to changing the temperature, one of the parts may be captured within by the other. Release of the captured part may then be achieved by changing the temperature back. The released part may then be ejected (e.g., via a kickoff spring) and, in some cases, a tell-tale or other indicator of release may be triggered.

In one example embodiment, an actuator is provided. The actuator may include a capturing part, a retained part and at least one heating element that is disposed to apply heat to the retained part or the capturing part responsive to selective application of power to the at least one heating element. The capturing part is attachable to a first object and is formed of a material having a first coefficient of thermal expansion. The retained part is attachable to a second object and is formed of a material having a second coefficient of thermal expansion. The retained part is insertable into the capturing part in a first state of the actuator. The retained part is held in contact with the capturing part via an interference fit to hold the first and second objects proximate to each other in a second state of the actuator. The retained part is ejected from the capturing part in a third state of the actuator. The first and second coefficients of thermal expansion are different such that applying heat via the at least one heating element causes a transition between the second state of the actuator and either of the first or third states of the actuator.

BRIEF DESCRIPTION OF THE SEVERAL VIEWS OF THE DRAWING(S)

Having thus described example embodiments of the invention in general terms, reference will now be made to the accompanying drawings, which are not necessarily drawn to scale, and wherein:

DETAILED DESCRIPTION

Figure 1:
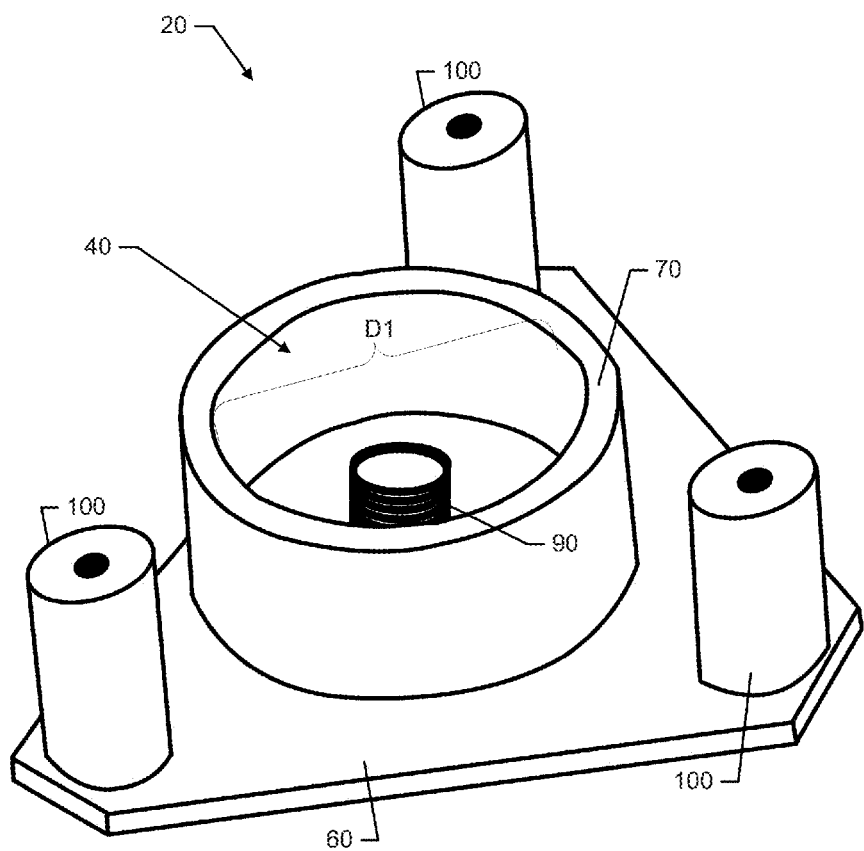
FIG. 1 is a top perspective view of a capturing part of an actuator according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Some example embodiments may enable the provision of a highly reliable actuator that has a relatively simple construction and few moving parts. The actuator may have very low shock and operate with low power and low current. The actuator may employ a capturing part and a retained part that is to be held by the capturing part. The capturing part and retained part may each have a different coefficient of thermal expansion (CTE) so that temperature changes are used to alternately capture and release the retained part in the capturing part.

The simple construction may provide reliability and simplicity while still keeping costs relatively low. Some embodiments may be used in connection with low power heating elements to enable remote actuation of the actuator. The reliability and performance of the actuator may make it well suited for use in relatively harsh environments such as on aircraft, spacecraft, satellites, submarines, and/or the like. The actuator may therefore provide a reliable mechanism by which to deploy equipment, instruments and/or the like. Moreover, some embodiments may further employ a release indicator (or tell-tale) to reliably indicate to a remotely located operator that the equipment, instruments and/or the like that are deployed via the actuator have been successfully ejected from their docked position.

Figure 2:
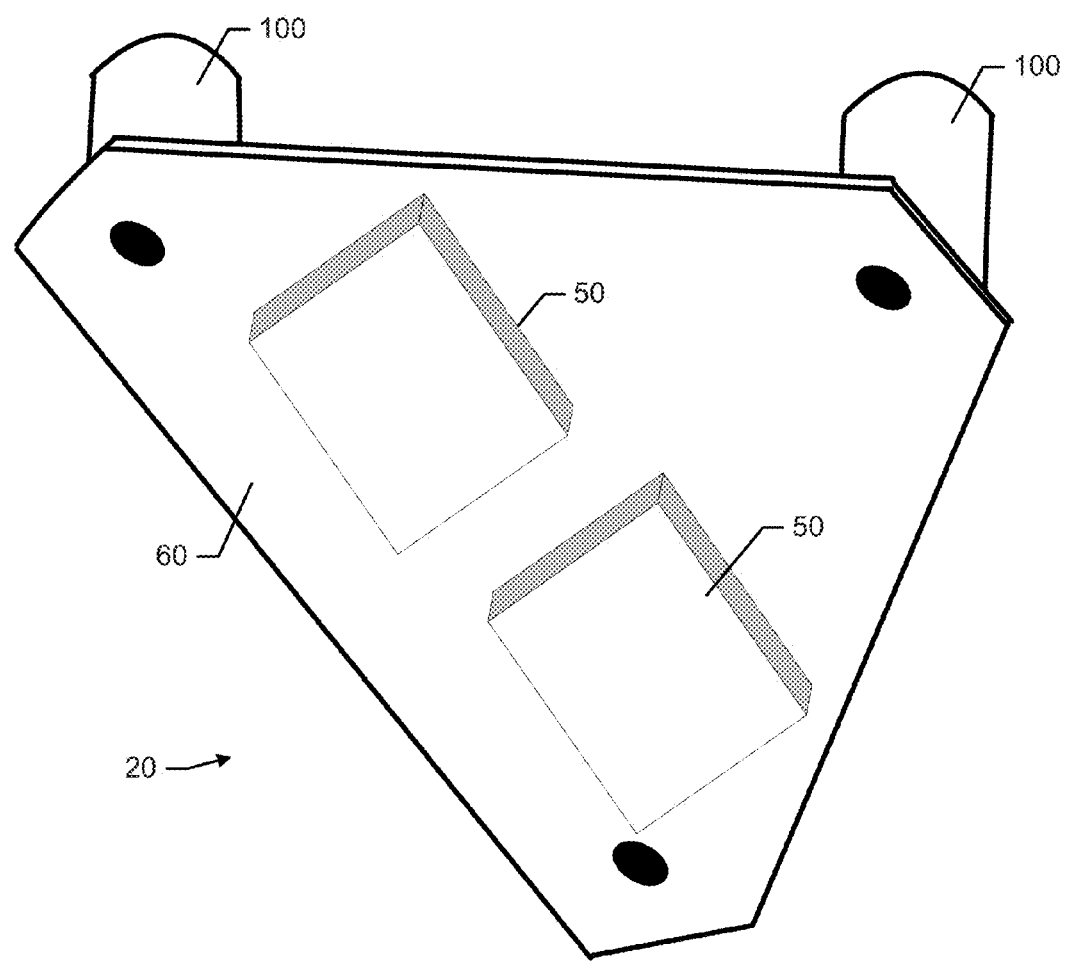
FIG. 2 is a bottom perspective view of the capturing part of FIG. 1 according to an example embodiment.
Figure 3:
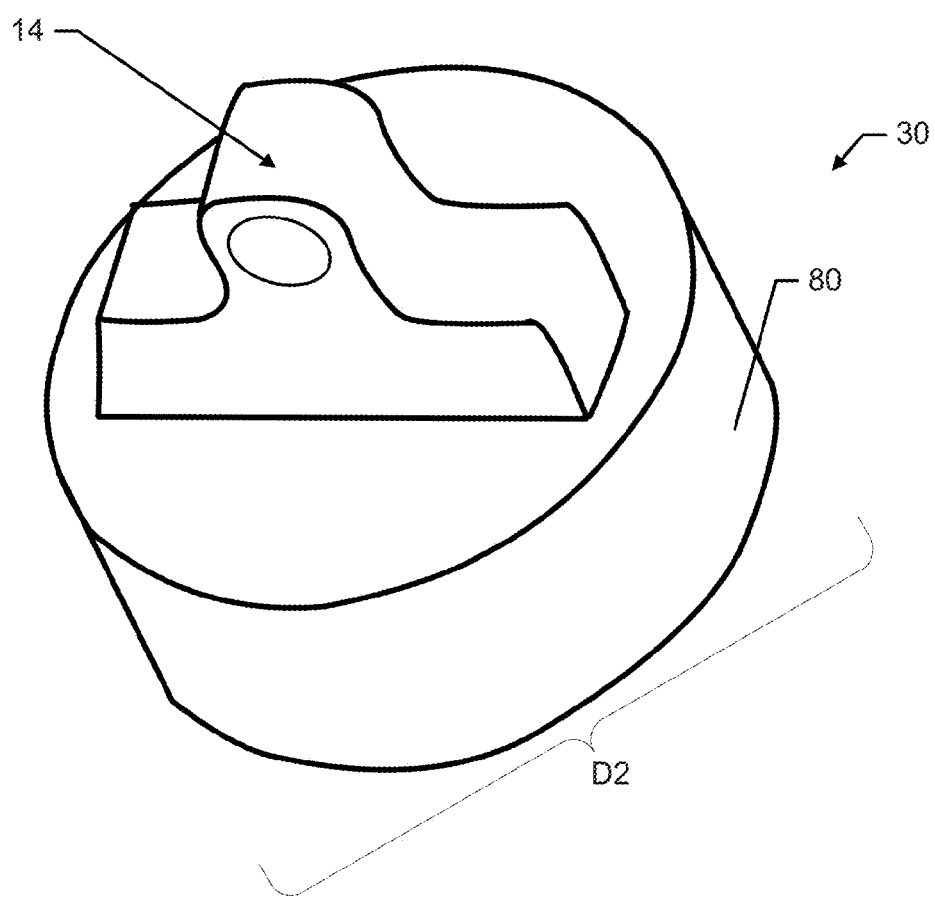
FIG. 3 is a top perspective view of a retained part of the actuator of FIG. 1 according to an example embodiment.
Figure 4:
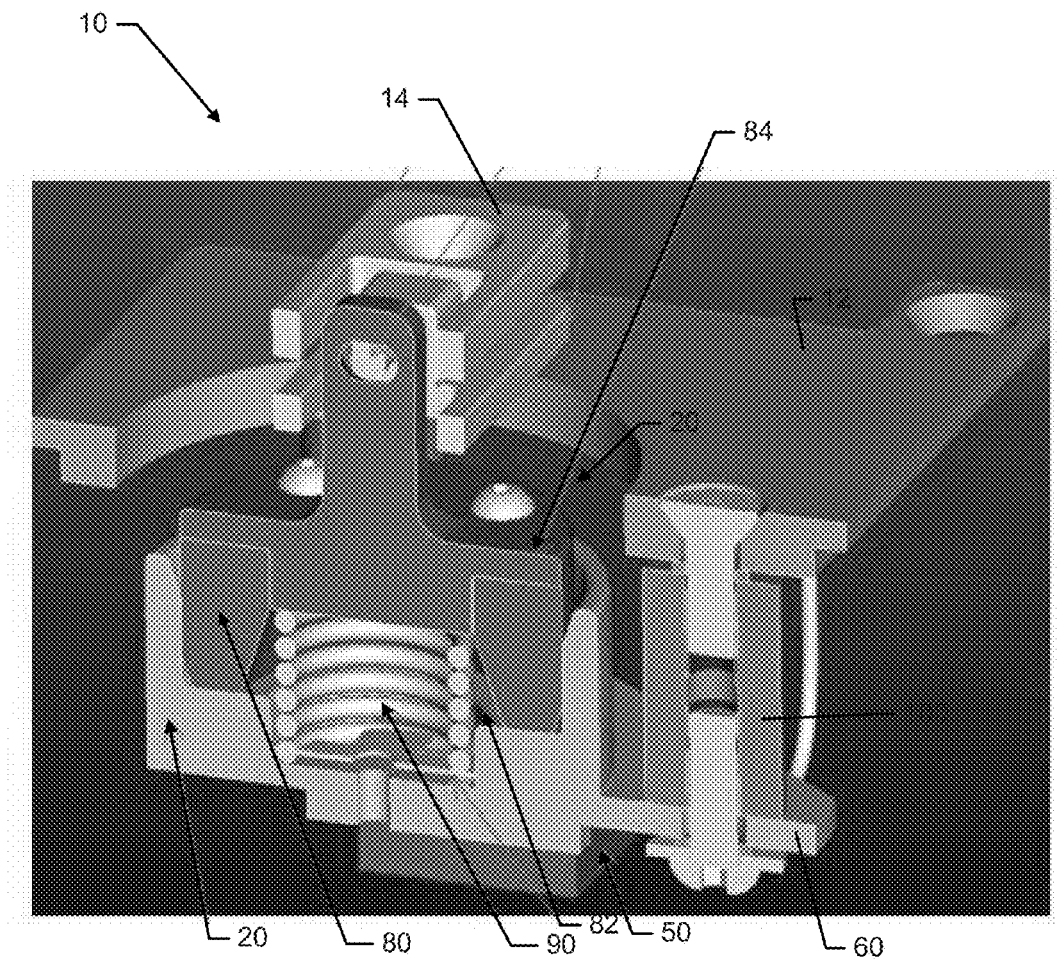
FIG. 4 illustrates a cross section view of the actuator according to an example embodiment.

FIG. 1 is a top perspective view of a capturing part of an actuator according to an example embodiment. FIG. 2 is a bottom perspective view of the capturing part of FIG. 1 according to an example embodiment. FIG. 3 is a top perspective view of a retained part of the actuator of FIG. 1 according to an example embodiment. FIG. 4 illustrates a cross section view of the actuator according to an example embodiment. It should be appreciated that although the actuator of FIGS. 1-4 shows a substantially cylindrically shaped retained part, any suitable shape could be employed in connection with other example embodiments for both the retained part and the capturing part.

Referring now to FIGS. 1-4, an actuator 10 of an example embodiment will be described. The actuator 10 may include a capturing part 20 that is configured to releasably hold a retained part 30 based on temperature changes applied to the actuator 10. The actuator 10 may operate to selectively release a piece of equipment, instrument or other component responsive to remote actuation of the actuator 10 (e.g., based on initiation of the temperature change). In an example embodiment, as shown in FIG. 4, the capturing part 20 may be mounted to a platform 12 or surface. Meanwhile, the retained part 30 may be coupled to a mount 14 that may connect to the piece of equipment, instrument or other component. When the actuator 10 is actuated remotely, the retained part 30 may be released from the capturing part 20 such that the capturing part 20 remains fixed in contact with the platform 12, but the retained part 30 is released and, in some cases, separated or ejected from the capturing part 20 so that the piece of equipment, instrument or other component attached to the mount 14 is free to move away from the platform 12.

In an example embodiment, remote actuation of the actuator 10 may be accomplished by initiating a temperature change, as mentioned above. The temperature change may actuate the actuator 10 due to the fact that, in some embodiments, the capturing part 20 and the retained part 30 may be made of materials that each have a different CTE. Accordingly, in some embodiments, such as the example embodiment that will be described in connection with the example of FIGS. 1-4, the retained part 30 may be made of a material having a low CTE and the capturing part 20 may be made of a material having a high CTE. In some example embodiments, the material having a low CTE may be titanium (e.g., 6AL4V titanium). However, other materials with a low CTE could alternatively be employed. In some example embodiments, the material having the high CTE may be aluminum (e.g., 6061-T6 aluminum). However, other materials with a high CTE could alternatively be employed.

The low CTE characteristic of the retained part 30 may cause the retained part 30 to be relatively insensitive to temperature changes (at least in relation to expansion and/or contraction of the material used to form the retained part 30). Meanwhile, the material with the high CTE (i.e., the capturing part 20) may be heated to enable the retained part 30 to fit within a reception sleeve 40 of the capturing part 20. Responsive to cooling of the capturing part 20, the retained part 30 may be fixed within the reception sleeve 40 by an interference fit between the capturing part 20 and the retained part 30. Thereafter, responsive to heating of the capturing part 20, the reception sleeve 40 may release the retained part 30.

In this regard, for example, the high CTE of the capturing part 20 may cause the material of the capturing part 20 (and therefore also the reception sleeve 40) to expand as the capturing part 20 is heated. Accordingly, an internal diameter (D1) of the reception sleeve 40 may increase slightly responsive to heating of the capturing part 20. When the reception sleeve 40 expands in diameter, the retained part 30 may be insertable into the reception sleeve 40 without contact, or at least with relatively small or minimal contact, between the reception sleeve 40 and the retained part 30. Thus, for example, an external diameter (D2) of the retained part 30 may be smaller than the internal diameter (D1) of the reception sleeve 40 when the reception sleeve 40 is heated above a threshold temperature. However, when the reception sleeve 40 is cooled to below the threshold temperature, the internal diameter (D1) of the reception sleeve 40 may decrease to more closely approach the external diameter (D2) of the retained part 30 to create an interference fit therebetween if the retention part 30 is inserted into the reception sleeve 40 prior to the cooling taking place.

In an example embodiment, one or more heating elements 50 may be placed in contact with a body 60 of the capturing part 20 to apply heat to the capturing part 20 when the heating elements 50 are energized by a power source (not shown). The heating elements 50, which are visible in FIG. 2, are shown as being disposed on a bottom portion of the body 60. However, it should be appreciated that any number of heating elements 50 could be disposed any suitable location on the capturing part 20.

The heating elements 50 may be embodied in any suitable manner. However, in an example embodiment, the heating elements 50 may be embodied as a pair of 50 W thick film power resistors. Such resistors may be capable of delivering a peak temperature of between about 115° C. to about 135° C., which may generate, for example, a temperature rise of between about 40° C. to about 50° C. to cross a predetermined temperature threshold for switching the actuator 10 between actuated and not actuated states. Using two heating elements 50 (or more) may provide for redundancy to increase reliability. The heating elements 50 may be affixed to the body 60 via fasteners, glue or other adhesive materials (preferably non-insulating), or via mating of surfaces machined to engage one another. When energized, the heating elements 50 may apply heat to the body 60, which may be transmitted to sidewalls 70 that form the reception sleeve 40. As shown in FIG. 1, the sidewalls may extend from the body 60 in a direction substantially perpendicular to a plane in which the body 60 lies. Moreover, the sidewalls 70 may form a hollow cylinder having a shape substantially matching that of a plug body 80 of the retained part 30. Thus, for example, the sidewalls 70 may form a cup-like shape in combination with the body 60 into which the retained part 30 may be insertable for selective retention and release based on the temperature of the capturing part 20 as controlled via the heating elements 50.

Although the retained part 30 may be machined, molded or otherwise manufactured to be a single, solid cylindrical object or plug, some embodiments may modify the structure of the retained part 30 to impart certain characteristics that may be desirable for some embodiments. In this regard, for example, some applications it may be desirable to cause separation of the retained part 30 from the capturing part 20 when the actuator 10 is actuated. To achieve such separation, a spring (e.g., kickoff spring 90) may be compressed when the retained part 30 is fully seated in the capturing part 20. Thus, for example, the kickoff spring 90 may be mounted to the body 60 within the reception sleeve 40. As shown in FIG. 4, the insertion of the retained part 30 into the reception sleeve 40 may compress the kickoff spring 90 against the body 60 so that when the interference fit between the reception sleeve 40 and the retained part 30 is relaxed, the kickoff spring 90 may release and exert a spring force to push the retained part 30 out of the reception sleeve 40. To provide sufficient space for the kickoff spring 90 to be accommodated, the plug body 80 may have a cavity 82 disposed at a central portion thereof. The inclusion of the cavity 82 may make the retained part 30 more cup-like in its shape instead of being a solid cylindrical object.

Additionally or alternatively, the retained part 30 may be manufactured to include at least two separate parts that may be joined together. For example, as shown in FIG. 4, the plug body 80 may be formed as a hollowed out, substantially cylindrically shaped component with the cavity 82 extending completely through the axis of the retained part 30. A plug back 84 may be provided at one end of the plug body 80 to fill a portion of the cavity 82 and provide an interface with the mount 14. The plug back 84 may be mounted to the plug body 80 via screws or other fasteners and a portion of the plug back 84 may actually contact the kickoff spring 90. In some cases, the plug body 80 may be installed at a high temperature and retained within the reception sleeve 40 at a lower temperature prior to the plug back 84 being coupled to the plug body 80. By installing the plug body 80 without the plug back 84, the plug body 80 may be carefully installed without pushing against the force of the kickoff spring 90. Pushing against the force of the kickoff spring 90 while installing the retained part 30 into the reception sleeve 40 may cause wavering or additional movement other than in the axial direction (e.g., a lateral load). Such wavering or movement other than in the axial direction may cause galling between the surfaces of the reception sleeve 40 and the retained part 30 (e.g., at the periphery of the plug body 80). Additionally, the taper of the interior of the plug body 80 may reduce the likelihood of the kickoff spring 90 hanging up on the plug body 80 when the actuator 10 is actuated.

Prevention of galling may generally increase the lifetime and reusability of the actuator 10. Thus, for example, the retained part 30 may be reused in connection with the same capturing part 20 numerous times. However, in some cases, different retained parts may be used with a single capturing part over different actuation operations, or different capturing parts may be used with a single retained part over different actuation operations so long as galling is minimized so that the surfaces are relatively unmodified by each use.

Figure 5:
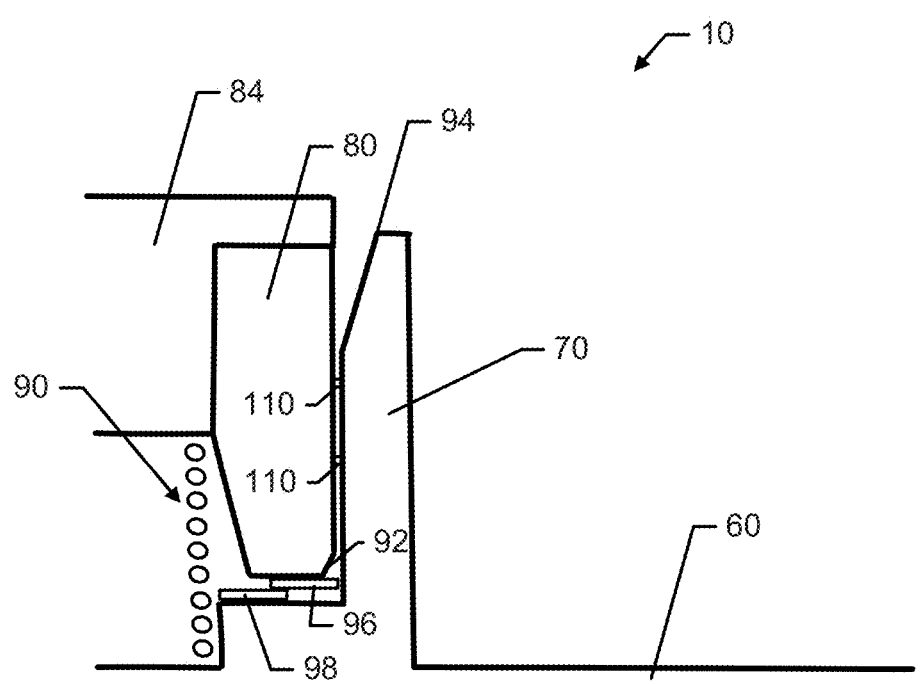
FIG. 5 illustrates an example embodiment of the actuator of FIGS. 1-4 with optional modifications applied thereto according to another example embodiment.

A number of anti-galling techniques may be employed. For example, in some embodiments, the capturing part 20 may be coated with a hard coat anodized treatment and the retained part 30 may be coated with a titanium anodizing treatment. Although the sidewalls 70 forming the reception sleeve 40 may be formed to have an internal surface that extends along its entire length to be substantially perpendicular to a surface of the body 60 (or a plane in which the body 60 lies). In some cases, a top portion of the interior of the sidewalls 70 may be tapered and/or a bottom portion of the plug body 80 may be tapered as shown in FIG. 4 to reduce the potential for galling when the plug body 80 is installed into the reception sleeve 40. FIG. 5 illustrates a cross sectional view of a portion of the interface between the sidewalls 70 and the plug body 80.

As can be seen from FIG. 5, the plug body 80 may include a tapered portion 92 that extends around a periphery of a leading edge of the plug body 80 as the plug body 80 is installed into the reception sleeve 40. Meanwhile, the sidewalls 70 also include a tapered portion 94 at a top portion of the sidewalls 70 facing the reception sleeve 40. It should be appreciated that some embodiments may only employ one of the tapered portions (92 and 94) instead of employing both. However, other example embodiments may employ both or even neither of the tapered portions (92 and 94). When one or more of the tapered portions (92 and 94) are employed, alignment of the retained part 30 and the capturing part 20 may be enhanced, to further facilitate reduction of galling.

FIG. 5 illustrates an example embodiment of the actuator of FIGS. 1-4 with optional modifications. Of note the modifications shown in FIG. 5 may be utilized independently of one another or in combination in alternative embodiments. FIG. 5 (which is not necessarily drawn to scale with respect to the representation of electrical contacts therein) illustrates an example embodiment in which a tell-tale or release indicator is employed. In this regard, for example, some embodiments may employ relatively simple circuitry to facilitate the provision of a confirmation signal when the actuator 10 is actuated to release the retained part 30. As shown in FIG. 5, the release indicator may be embodied by a first electrical contact 96 and a second electrical contact 98. In some embodiments, the first and second electrical contacts 96 and 98 may be disposed to be spaced apart from each other. However, insertion of the plug body 80 into the reception sleeve 40 may cause the first and second electrical contacts 96 and 98 to make contact with each other and close a simple circuit. When the circuit is closed, a feedback circuit may either provide no indication to a remote operator or may provide an indication that the actuator 10 has not been actuated (i.e., that the retained part 30 is being retained in the capturing part 20). However, when the actuator 10 is actuated so that the retained part 30 is ejected from the capturing part 20, the circuit may be opened. Opening of the circuit may cause the feedback circuit to cease to provide the indication that the actuator 10 has not been actuated, or may actually trigger a positive indication that the actuator 10 has been actuated.

In an example embodiment, to further prevent or minimize galling, the internal surface of the sidewalls 70 and the external surface of the plug body 80 may also be machined or otherwise manufactured to have no or minimal surface imperfections. In some cases, machining tolerances for the retained part 30 and the reception sleeve 40 may be about +/−0.00015 inches to provide an interference fit between the two of about 0.0006 inches (nominal outer diameter to inner diameter).

In some embodiments, to avoid or reduce heat transfer from the capturing part 20 to the platform 12, the body 60 may be separated from the platform 12 by spacers 100. The spacers 100 may be made of an insulating material and may be threaded (e.g., via helicoils) to enable the platform 12 to be affixed to the body 60 (e.g., via a screw or other fastener engaging the spacer 100 to the body 60 and another screw or fastener engaging the spacer 100 to the platform 12 as shown in FIG. 4). In some embodiments, Vapor Deposited Aluminum (VDA) tape may be used to coat portions of the body 60 to reduce or minimize energy loss from radiation. However, other strategies may be employed to reduce or minimize parasitic heat loss in other embodiments as well.

In some cases, it may be desirable to minimize the amount of energy required for release. Minimizing the mass of components forming the reception sleeve 40 and minimizing the surface area of overlap (i.e., the interface area) between the retained part 30 and the capturing part 20 may assist in reducing the amount of energy required for release since a smaller change in temperature may initiate a release. To minimize, or at least reduce, the amount of energy required for release (or ejection) of the retained part 30, the plug body 80 of the retained part 30 may be provided with one or more ridges 110 provided on a surface of the periphery thereof. Two are shown in FIG. 5. However, any number of ridges 110 may be provided in alternative embodiments. The ridges may be engaged by a surface of the sidewalls 70 when the sidewalls contract responsive to cooling thereof in order to form the interference fit between the sidewalls 70 and the ridges 110. The ridges 110 may continuously extend all the way around the periphery of the plug body 80, or they may be discontinuous and only extend along one or more portions of the plug body 80. The ridges 110 may further be provided with any desired width and/or height of extension off of the surface of the periphery of the plug body 80. The height, width and other characteristics of the ridges 110 (if employed) may be selected to provide a desired amount of holding force generation by the interference fit when the retained part 30 is being held in place by the captured part 20. Furthermore, in some cases, the ridges 110 may be provided on internal portions of the sidewalls 70 instead of being provided on the plug body 80.

As indicated above, the retained part 30 may be insertable into (or may be withdrawn from) the reception sleeve 40 when the capturing part 20 is heated above a particular temperature. This condition may be referred to as a first state of operation of the actuator 10. Thereafter, when the retained part 30 has been inserted into the reception sleeve 40 and the capturing part 20 is cooled, the internal diameter (D1) of the reception sleeve 40 may decrease slightly until an interference fit may be established between the reception sleeve 40 and the retained part 30. The establishment of the interference fit responsive to the removal of the heat source and/or cooling of the capturing part 20 may transition the actuator 10 into a second state (e.g., an engaged state). The tolerances of the internal diameter (D1) of the reception sleeve 40 and the external diameter (D2) of the retained part 30 may be very closely controlled in order to achieve desired characteristics for the actuator 10. For example, if more holding force is desired prior to actuation of the actuator 10, a surface area of contact area between the reception sleeve 40 and the plug body 80 of the retained part 30 may be increased. Thereafter, responsive to heating of the capturing part, the interference fit may be disestablished (e.g., due to an increase in diameter of the reception sleeve) and the retained part 30 may be ejected from the actuator 10 in a third state of the actuator 10.

Thus, for example, the retained part 30 may be mounted to an object that is deployable into an environment (e.g., space, undersea, etc.) and the capturing part 20 may be heated and cooled, and thereafter reheated, to enable the retained part 30 to be installed into the capturing part 20, retained therein, and subsequently ejected to separate the object from another object (e.g., a space vehicle, a submerged vehicle and/or the like) that provides a host platform for the capturing part 20. The capturing part 20 may be insulated from the host platform (e.g., via spacers) so that heat that is remotely and/or selectively applied to the capturing part 20 to affect actuation of the actuator 10 may not be communicated to the host platform.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An actuator comprising:
   a capturing part attachable to a first object, the capturing part being formed of a material having a first coefficient of thermal expansion;
   a retained part attachable to a second object, the retained part being formed of a material having a second coefficient of thermal expansion;
   at least one heating element disposed to apply heat to at least one of the retained part and the capturing part responsive to selective application of power to the at least one heating element;
   an actuation indicator that provides an indication signal to a remote operator as to whether the retained part is disposed within the capturing part; and
   a kickoff spring disposed at the capturing part,
   wherein the retained part is insertable into the capturing part in a first state of the actuator,
   wherein the retained part is held in contact with the capturing part via an interference fit to hold the first and second objects proximate to each other in a second state of the actuator,
   wherein the retained part is ejected from the capturing part in a third state of the actuator,
   wherein the first and second coefficients of thermal expansion are different from each other such that applying heat via the at least one heating element causes a transition between the second state of the actuator, one of the first and third states of the actuator and
   wherein a spring force of the kickoff spring ejects the retained part responsive to a transition from the second state to the third state to separate the second object from the first object, and
   wherein the retained part comprises a plug back and a plug body, the plug body forming a cavity into which the kickoff spring is disposed in the first state of the actuator.

2. The actuator of claim 1, wherein the retained part has a first diameter and the capturing part has a second diameter, wherein the first diameter is substantially the same in the first, second and third states, and wherein the second diameter changes during a transition between the second state of the actuator and one of the first and third states of the actuator.

3. The actuator of claim 2, wherein the retained part comprises a substantially cylindrically shaped plug body having the first diameter, and the capturing part comprises a reception sleeve having sidewalls disposed proximate to a periphery of the plug body responsive to insertion of the retained part into the capturing part.

4. The actuator of claim 3, wherein the sidewalls extend substantially perpendicularly away from a plane in which a body portion of the capturing part lies.

5. The actuator of claim 4, wherein a portion of a distal end of the sidewalls that faces the plug body when the plug body is inserted into the reception sleeve is angled away from the plug body.

6. The actuator of claim 4, wherein a portion of a distal end of the plug body is angled away from the sidewalls.

7. The actuator of claim 1, wherein the kickoff spring does not impart a force on the plug body, and wherein, the plug back is attachable to the plug body after the retained part is held by the capturing part in the second state of the actuator.

8. The actuator of claim 1, wherein the actuation indicator comprises a first contact and a second contact, the first and second contacts being held in contact with each other in the second state of the actuator to form a closed circuit and being separated from each other to create an open circuit responsive to transition to the third state of the actuator.

9. The actuator of claim 1, wherein the capturing part has a greater coefficient of thermal expansion than the retained part.

10. The actuator of claim 9, wherein the capturing part comprises aluminum and the retained part comprises titanium.

11. The actuator of claim 10, wherein a hard coat anodized treatment is applied to the capturing part and a titanium anodizing treatment is applied to at least a periphery of the retained part.

12. The actuator of claim 1, wherein the first object is held proximate to the capturing part via at least one insulating spacer.

13. The actuator of claim 1, wherein the at least one heating element is disposed on an opposite side of a body portion of the capturing part with respect to a side of the capturing part proximate to which the retained part is held in the second state.

14. The actuator of claim 1, wherein the retained part comprises at least one ridge extending at least partially around a periphery thereof, the at least one ridge forming the interference fit with the capturing part in the second state of the actuator.

15. The actuator of claim 1, wherein the at least one heating element comprises two thick film power resistors.

16. The actuator of claim 1, wherein ejection of the retained part from the capturing part causes complete separation of the first object from the second object and of the retained part from the capturing part.

* * * * *